United States Patent [19]
Nichols et al.

[11] Patent Number: 5,512,905
[45] Date of Patent: Apr. 30, 1996

[54] POLE-TILT SENSOR FOR SURVEYOR RANGE POLE

[75] Inventors: Mark E. Nichols, Sunnyvale; Nicholas C. Talbot, Cupertino, both of Calif.

[73] Assignee: Trimble Navigation Limited, Sunnyvale, Calif.

[21] Appl. No.: 329,213

[22] Filed: Oct. 27, 1994

[51] Int. Cl.⁶ .............................. H04B 7/185; G01S 5/02
[52] U.S. Cl. .............................................. 342/357; 33/366
[58] Field of Search .............................. 342/357; 33/394, 33/395, 366

[56] References Cited

U.S. PATENT DOCUMENTS

| 4,754,553 | 7/1988 | Simpson | 33/366 |
| 5,077,557 | 12/1991 | Ingensand | 342/357 |

Primary Examiner—Theodore M. Blum
Attorney, Agent, or Firm—Thomas E. Schatzel

[57] ABSTRACT

A surveyor range pole, for example, equipped with a GPS receiver and antenna mounted at the top end, a battery mounted at the bottom end to better balance the pole, a tilt sensor and a direction sensor. The tilt sensor and direction sensor provide information about the vector that lies between the top and the bottom points of the range pole. The GPS receiver computes the position of the top end of the range pole from GPS satellite signals received by the GPS at the top end, and then computes the position of the bottom end of the range pole with the vector information. A variable length, telescoping range pole includes a linear transducer for automatically measuring the overall length of the range pole and contributing that length information to the vector calculation.

11 Claims, 1 Drawing Sheet

POLE-TILT SENSOR FOR SURVEYOR RANGE POLE

BACKGROUND OF THE INVENTION

1. Field of the Invention

The invention relates generally to land surveying devices and more specifically to global positioning system based apparatus for land surveying.

2. Description of the Prior Art

Land surveyors conventionally use prisms mounted to poles for targeting by a total station. A typical pole is about five feet long. The pole is held over a target mark on the ground and must be held plumb by a surveyor. Otherwise, an error will be made, because the calculations of the target mark position depend on knowing the length of the pole and on having the prism positioned directly over the mark. The pole is usually plumbed with the aid of a bubble level in a circular vial. An off-plumb condition of the pole could be corrected for with calculations and the correct position of the mark nevertheless determined if the degree of tilt and the direction of tilt were known and included in the calculations. Ordinarily, ascertaining the degree of tilt and its direction would be clumsy and including this information in the calculation of the mark position would be difficult. It is far easier just to hold the pole plumb.

Global positioning system (GPS) receivers have been finding their way into land surveying uses, especially those units that are accurate to a fraction of a centimeter. The GPS receivers use signals received from typically four or more overhead satellites to determine navigational data such as position and velocity. Such systems may also provide altitude and time. GPS signals are available worldwide at no cost and can be used to determine the location of a vehicle, such as a car or truck, to within one city block, or better. Dual-frequency carrier GPS receivers typically track a pair of radio carriers, L1 and L2, associated with the GPS satellites, to generate accumulated delta-range measurements (ADR) from P-code modulation on those carriers and at the same time track L1 coarse acquisition code (C/A-code) to generate code phase measurements. Carrier L1 has a frequency of 1575.42 MHz and carrier L2 has a frequency of 1227.78 MHz.

A number of specific survey applications require the ability to accurately locate existing physical position marks and generate new physical position marks from pre-selected locations contained in a database. These include the marking of positions used in construction and building sites, referred to as stake-out. The pre-selected positions would typically exist on the construction plans. The accuracy of the generated position marks must typically be to within five millimeters to three centimeters.

Traditional techniques for generating physical position marks from a mapping database rely on optical instruments such as theodolites and EDM (electronic distance measurement) devices. A more recent survey device is the Total Station that combines a theodolite and an EDM device. A disadvantage of such systems is the necessity for clear visibility between a reference mark, and the new position mark. Without such visibility, multiple measurements may be necessary, which may result in the accumulation of errors.

GPS receivers, or simply their antennas, may be mounted to a land surveyor's pole, but the problem persists in the prior art that such poles must be held plumb. It is, however, human nature not to be unerringly careful about such things. So once in a while such GPS-equipped poles are not held plumb while the measurement is taken. Since desired accuracies in land surveying are typically in the range of five millimeters to one centimeter, even a small amount of range pole tilt can be significant. For example, even a careful manual plumbing of the range pole can result in the top of the pole being as much as five centimeters out of vertical from the bottom.

SUMMARY OF THE PRESENT INVENTION

It is therefore an object of the present invention to provide a land surveying instrument that combines a GPS receiver and a land surveyor's pole with automatic compensation for any out-of-plumb condition of the pole during measurement taking.

Another object of the present invention is to provide a method of compensating a theodolite measurement where the surveying range pole is out-of-plumb.

Briefly, a surveyor range pole embodiment of the present invention comprises a GPS receiver and antenna mounted at the top end of a range pole, a battery mounted at the bottom end to better balance the pole, a tilt sensor and a direction sensor. The tilt sensor and direction sensor provide information about the vector that lies between the top and the bottom points of the range pole. The GPS receiver, computes the position of the top end of the range pole from GPS satellite signals received by the GPS at the top end, and then computes the position of the bottom end of the range pole with the vector information. A variable-length telescoping range pole includes a linear transducer for automatically measuring the overall length of the range pole and contributing that length information to the vector calculation.

An advantage of the present invention is a range pole is provided with automatic tilt compensation.

Another advantage of the present invention is an add-on device is provided that straps onto conventional range poles and provides data for compensating for range pole verticality errors.

A further advantage of the present invention is that a surveyor range pole is provided that is stable and easy to use because its center of gravity is situated toward the bottom end of the range pole which is pointed on the ground during use.

Another advantage of the present invention is that a range pole is provided that improves land surveying accuracy.

A still further advantage of the present invention is that an all-in-one range pole is provided that is a complete functional unit.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
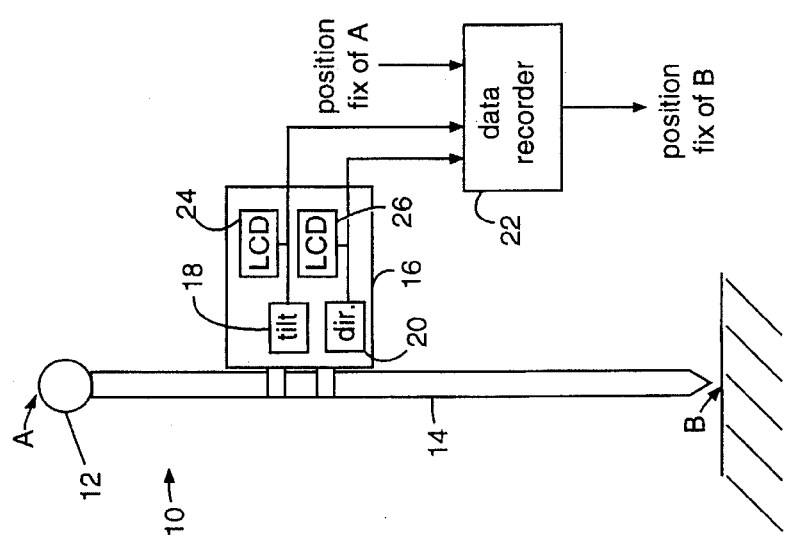
FIG. 1 is a block diagram of a land surveying instrument embodiment of the present invention that includes a range pole with an instrument package to provide readouts of the pole tilt and tilt direction.

FIG. 1 illustrates a land survey in instrument embodiment of the present invention, referred to herein by the general reference numeral 10. The surveying instrument 10 has a top end with a point "A" that is held during use vertically over a bottom end with a point "B" on the ground. A "total station", e.g., comprised of a theodolite transit and electronic distance measuring device, is used to range to target, e.g., a prism 12, to determine the position and altitude on earth of the point "A". If the length of a range pole 14 between points "A" and "B" is known, and if the point "A", is held exactly vertically above the point "B", then the length can simply be subtracted from the altitude determined for the point "A" to yield the position and altitude of the point "B".

As illustrated in FIG. 1, an instrument package 16 is included in the surveying instrument 10 and is clamped tight to the range pole 14. The package 16 includes a tilt sensor 18 and a direction sensor 20, for azimuth, that provide information about the degree of angular tilt of the range pole 14 and the, e.g., compass, direction of any such tilt to a separate data recorder 22. The position fix of the point "A" is fed into the data recorder 22 manually from the total station operator or automatically from the total station itself. The tilt and direction information is matched with the position fix of the point "A" and post-processing with the data recorded can yield the position of the point "B". The instrument package 16 preferably is adapted to strap to existing, conventional range poles. The information supply to the data recorder 22 alternatively includes providing visual digital displays of the tilt and direction on the instrument package 16 itself, which are then manually read and entered by an operator into the data recorder 22. A magnetic flux-gate sensor may be used to implement the direction sensor 20 with appropriate corrections made for true compass direction, or a switch may be provided to be pressed by an operator when the range pole 14 is rotated around to a particular reference direction, e.g., north.

A liquid crystal display (LCD) 24 is alternatively connected to the tilt sensor 18 for indicating to a user the degree of any range pole tilt. A second LCD 26 is connected to the direction sensor 20 to indicate to the user the direction of any said tilt. Such a readout may preferably be corrected for any local variation in magnetic compass headings. With the LCD's 24 and 26, readout information provided by them in degrees of tilt and heading may be logged in a book or manually entered into the data recorder 22.

Figure 2:
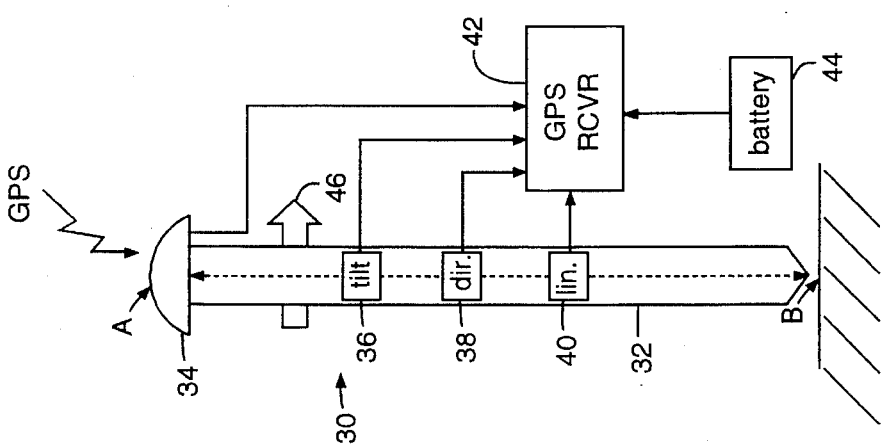
FIG. 2 is a block diagram of a range pole system according to another embodiment of the present invention that includes a GPS antenna in the range pole.

In FIG. 2, a range pole system 30 does not require a total station. A pole 32 with a variable, telescoping length has mounted at its top a microwave receiving antenna 34, e.g. for reception of satellite navigation system transmissions, such as from the United States global positioning system (GPS) or the Russian system called the global orbiting navigation satellite system (GLONASS). Orbiting GPS or GLONASS satellites transmit signals that are received by the antenna 34 and the transit times of these signals from several determinable heavenly orbit positions can be used in a position and altitude determination of the point "A", which coincides with the antenna 34. For more information on GLONASS, refer to copending U.S. patent application, GLOBAL ORBITING NAVIGATION SATELLITE SYSTEM RECEIVER, Ser. No. 08/287,187, filed Aug. 8, 1994, which is incorporated herein by reference.

The GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geo-synchronous, with 0.5 sidereal day (11.967 hours) orbital time intervals, so that the satellites move with time relative to the earth below. Theoretically, four or more GPS satellites will be visible from most points on the earth's surface, and visual access to four or more such satellites can be used to determine an observer's position anywhere on the earth's surface, 24 hours per day. Each satellite carries a cesium and rubidium atomic clock to provide timing information for the signals transmitted by the satellites. Internal clock correction is provided for each satellite clock.

Each GPS satellite transmits two spread spectrum, L-band carrier signals, an L1 signal having a frequency $f1=1575.42$ MHz and an L2 signal having a frequency $f2=1227.6$ MHz. The L1 signal from each satellite is binary phase shift key (BPSK) modulated by two pseudo-random noise (PRN) codes in phase quadrature, designated as the coarse acquisition code (C/A-code) and precision-code (P-code). The L2 signal from each satellite is BPSK modulated by only the P-code.

Use of the PRN codes allows several GPS satellite signals to be used simultaneously to determine an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of $10=10.23$ MHz. A second PRN code for each GPS satellite, sometimes referred to as a clear/acquisition code or C/A-code, is intended to facilitate rapid satellite signal acquisition and hand-over to the P-code and is a relatively short, coarser grained code having a clock or chip rate of $10=1.023$ MHz. The C/A-code for any GPS satellite has a length of 1023 chips and thus repeats every millisecond. The full P-code has a length of 259 days, with each satellite transmitting a unique portion of the full P-code. The portion of P-code used for a given GPS satellite has a length of precisely one week (7.000 days) before this code portion repeats.

The GPS satellite bit stream includes navigational information on the ephemeris of the transmitting GPS satellite and an almanac for all GPS satellites, with additional parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *Guide To GPS positioning*, edited by David Wells, Canadian GPS Associates, 1986.

A second configuration for global positioning is the global orbiting Navigation satellite system (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.80 relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the earth every 8 days. The GLONASS system uses two carrier signals L1 and L2 with frequencies of f1=(1.602+9k/16) GHz and f2=(1.246+7 k/16) GHz, where k (0,1,2, . . . , 23) is the channel or satellite number. These frequencies lie in two bands at 1.597–1.617 GHz (L1) and 1.240–1.260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

The highest possible accuracy in differential positioning, and thus in location of a mark, is obtained by measurement and utilization of the received carrier phase of the L1 and/or L2 signals at precisely known times, derived from clocks within satellite positioning system (SPS) receivers, e.g., GPS or GLONASS receivers. Some techniques for processing SPS data for surveying applications use only these carrier phase measurements in the calculation of differential positions, with measurement of PRN code phases only used to calculate accurate timemarks for the carrier phase measurements. Yet other methods also use PRN code phase measurements together with carrier phase measurements in the calculation of differential positions. Such a method has been described by Allison, in U.S. Pat. No. 5,148,179. Another such method is described by Hatch in U.S. Pat. No. 4,812,991, incorporated by reference herein. All these methods are applicable to the present invention.

In FIG. 2, a tilt sensor 36, a direction sensor 38 and a linear transducer 40 provide degree of tilt, direction of tilt and overall length information for the pole 32 to a GPS or GLONASS receiver 42. A battery 44 powers the system 30. In an alternative embodiment, the direction sensor 38 is eliminated, in favor of manually rotating the pole 32 to face in a reference direction. An orientation marker 46 visually indicates to the user which direction should be the direction to a reference, e.g., north.

The receiver 42 computes a vector from data representing the degree of tilt, direction of tilt and overall length of the pole 32 and uses this vector in a calculation to compute the position and altitude of the point "B" from its determination of the position and altitude of the point "A". Alternatively, the pole 32 can have a fixed length which is worked into the calculation of the position and altitude of point "B" from the position and altitude of point "A", therefore making the linear transducer 40 unnecessary. Several cables, or one cable bundle, interconnect he elements mounted in the pole 32 with the receiver 42.

Figure 3:
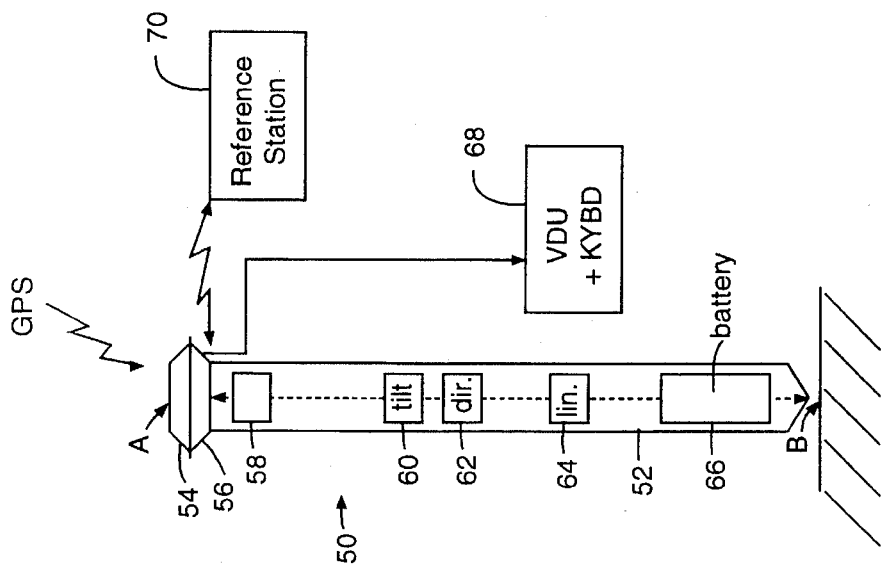
FIG. 3 is a block diagram of an all-in-one surveying system embodiment of the present invention that places all the required instruments to fix a position and altitude in a housing resembling a conventional range pole.

An all-in-one surveying system 50, in FIG. 3, eliminates the interconnecting cables that are necessary in the range pole system 30 of FIG. 2. A pole 52 has mounted to it a microwave antenna 54 connected to a satellite navigation receiver 56, a radio transceiver and modem 58, a tilt sensor 60, a direction sensor 62, a linear transducer 64 and a battery 66. A video display unit (VDU) and keyboard (KYBD) 68 allows a user to read out and enter data. The radio transceiver and modem 58 are preferably used to receive differential correction data from a reference station transmitter with a precisely known location. Alternatively, the radio transceiver and modem 58 is used to transmit out either the computed position and altitude of the point "B" or the raw data needed at a remote post-processing site. Such raw data comprises range measurement data from the antenna 54 to any visible navigation satellites, and the tilt, direction-of-tilt and the length of the pole 52 measured by the tilt sensor 60, the direction sensor 62 and the linear transducer 64. From such data, conventional post-processing techniques can be used to compute the position and altitude of the point "B".

In use, the point "A" is positioned vertically above the point "B" on the ground surface. The battery 66 is located in the pole 52 proximate to the point "B", in order to avoid having the system 50 be top heavy, which makes it easier to wield.

Alternatively, a ballast weight can be positioned in the pole 52 to make the overall system assembly 50 more stable in use.

The tilt sensors 18, 36 and 60 may each comprise a single, two-axis device, or a pair of single axis devices with their respective axes set at right angles to one another and perpendicular to the length of their respective poles 14, 32 and 52. The tilt sensors 18, 36 and 60 may produce either analog voltage or digital outputs representative of the magnitude the pole is tilted. An analog tilt sensor may comprise as simple a device as a weight attached to a pendulum on the shaft of a precision potentiometer.

Very often the operator of system 50 will have to relocate to a new point "B" some distance away from the last point "B". The system 50 provides an information display on the VDU 68 that instructs the user to the new position, e.g., "forward five meters and left five meters". The prior art devices are limited to providing, for example, "move seven meters at 45° true compass". The problem is that an operator finds such guidance hard to follow. The system 50 is able to provide relative directions, e.g., forward, back, left and right, by virtue of the information provided by the direction sensor 62.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A range pole system, comprising:

a pole section having a first end "A" for use generally in a skyward direction and a second end "B" for use generally in contact with a ground surface;

a satellite navigation system microwave radio antenna mounted to said first end "A" of the pole section;

a two-axis level sensor mounted to the pole section for determining the magnitude of any relative out of vertical tilt of said first end to said second end of the pole section;

a direction sensor mounted to the pole section relative to the level sensor for determining the orientation of the two-axis level sensor direction of any said tilt of said first end to said second end of the pole section; and cabling means connected to the antenna, the level sensor and the direction sensor for outputting received satellite transmissions and signals representing the tilt and direction-of-tilt of the pole section to a satellite navigation receiver;

wherein a position and altitude of said second end "B" may be determined by projection from a position and altitude determination of said first end "A" along a vector described at least in part by data from the level sensor and the direction sensor.

2. The system of claim 1, further comprising:

a satellite navigation receiver including computing means connected to the antenna, the two-axis level sensor and the direction sensor for calculating and outputting an estimate for a position fix of said second end "B" of the pole section as determined by a position-fix of said first end "A" and a vector equal to a predetermined length of the pole section and a direction indicated by both the level sensor and the direction sensor.

3. The system of claim 1, further comprising:

telescoping means included within the pole section for increasing and decreasing the physical distance between said first end "A" and said second end "B"; and linear transducer means mechanically connected to the telescoping means and electrically connected to the cabling means for outputting a signal representative of the physical distance between said first end "A" and said second end "B".

4. The system of claim 3, further comprising:

a satellite navigation receiver including computing means connected to the antenna, the two-axis level sensor, the direction sensor and the linear transducer, the direction sensor for calculating and outputting an estimate for a position fix of said second end "B" of the pole section as determined by a position-fix of said first end "A" and a vector equal to the length of the pole section and a direction indicated by both the level sensor and the compass.

5. A range pole surveying system comprising:

a pole section having a first end "A" for use generally in a skyward direction and a second "B" for use generally in contact with a ground surface;

position and altitude determination means connected to the pole section for determining the altitude and position of said second end "B" from a position and altitude determination of said first end "A", the position and altitude determination means comprising a satellite navigation system microwave radio antenna mounted to said first end "A" of the pole section, a level sensor mounted to the pole section for determining the magnitude of any relative tilt of said first end "A" to said second end "B" of the pole section, and a direction sensor mounted to the pole section relative to the level sensor determining the direction of any said tilt of said first end "A" to said second end "B" of the pole section, wherein, the antenna, level sensor and direction sensor provides data for the automatic determination of the position and altitude of said second end "B" from a navigation computer determination the position and altitude of the antenna and therefore said first end "A" regardless of the plumb condition of ends "A" and "B" and a battery connected to power the position and altitude determination means and disposed in the pole section proximate to said second end "B" such that the center of gravity of the pole section is closer to said second end "B" than said first end "A".

6. The system of claim 5, the position and altitude determination means further comprises:

a satellite navigation receiver including computing means connected to the antenna, the level sensor and the direction sensor for calculating and outputting an estimate for a position fix of said second end "B" of the pole section as determined by a position-fix of said first end "A" obtained from the position determining means and a vector equal to a predetermined length of the pole section and a direction indicated by both the two-axis level sensor and the direction sensor.

7. A range pole surveying system comprising:

a pole section having a first end "A" for use generally in a skyward direction and a second end "B" for use generally in contact with a ground surface;

telescoping means included within the pole section for increasing and decreasing the physical distance between said first end "A" and said second end "B";

linear transducer means mechanically connected to the telescoping means and electrically connected to output a signal representative of the physical distance between said first end "A" and second end "B";

position and altitude determination means connected to the pole section for determining the altitude and position of said second end "B" from a position and altitude determination of said first end "A" comprising a satellite navigation system microwave radio antenna mounted to said first end "A" of the pole section, a level sensor mounted to the pole section for determining the magnitude of any relative tilt of said first end "A" to said second end "B" of the pole section, a direction sensor mounted to the pole section relative to the level sensor for determining the direction of any said tilt of said first end "A" to said second end "B" of the pole section, and a satellite navigation receiver including computing means connected to the antenna, the two-axis level sensor, the direction sensor and the linear transducer for calculating and outputting an estimate for a position fix of said second end "B" of the pole section as determined by a position-fix of said first end "A" obtained from the position determining means and a vector equal to the length of the pole section and a direction indicated by both the two-axis level sensor and the direction sensor; and a battery connected to power the position and altitude determination means and disposed in the pole section proximate to said second end "B" such that the center of gravity of the pole section is closer to said second end "B" than said first end "A".

8. A range pole surveying system, comprising:

a pole section having a first end "A" for use generally in a skyward direction and a second end "B" for use generally in contact with a ground surface;

position and altitude determination means connected to the pole section for determining the altitude and position of said second end "B" from a position and altitude determination of said first end "A";

a battery connected to power the position and altitude determination means and disposed in the pole section proximate to said second end "B" such that the center of gravity of the pole section is closer to said second end "B" than said first end "A" and a radio transceiver and modem connected to the position and altitude determination means for receiving a radio signal from a reference station representing the position and altitude correction data.

9. A range pole surveying system, comprising:

a pole section having a first end "A" for use generally in a skyward direction and a second end "B" for use generally in contact with a ground surface;

a battery connected to power position and altitude determination means and disposed in the pole section proximate to said second end "B" such that the center of gravity of the pole section is closer to said second end "B" than said first end "A";

a satellite navigation system microwave radio antenna mounted to said first end "A" of the pole section;

a level sensor mounted to the pole section for determining the magnitude of any relative tilt of said first end "A" to said second end "B" of the pole section;

a direction sensor mounted to the pole section relative to the level sensor for determining the direction of any said tilt of said first end "A" to said second end "B" of the pole section;

telescoping means included within the pole section for increasing and decreasing the physical distance between said first end "A" and said second end "B";

linear transducer means mechanically connected to the telescoping means and electrically connected to output a signal representative of the physical distance between said first end "A" and said second end "B"; and a satellite navigation receiver connected to the battery and for determining the altitude and position of said second end "B" from a position and altitude determination of said first end "A" and including computing means connected to the antenna, the linear transducer, the level sensor and the direction sensor for calculating and outputting an estimate for a position fix of said second end "B" of the pole section as determined by a position-fix of said first end "A" and a vector with a length represented by said output of the linear transducer and a direction indicated by both the level sensor and the direction sensor.

10. The system of claim 9, further comprising:

a radio transceiver and modem connected to the satellite navigation receiver and the battery for transmitting out a radio signal representing the position and altitude of said second end "B" of the pole section.

11. A range pole surveying system, comprising:

pole section having a first end "A" for use generally in a skyward direction and a second end "B" for use generally in contact with a ground surface;

a battery connected to power the position and altitude determination means and disposed in the pole section proximate to said second end "B" such that the center of gravity of the pole section is closer to said second end "B" than said first end "A";

a satellite navigation system microwave radio antenna mounted to said first end "A" of the pole section;

a level sensor mounted to the pole section for determining the magnitude of any relative tilt of said first end "A" to said second end "B" of the pole section;

a direction sensor mounted to the pole section relative to the level sensor for determining the direction of any said tilt of said first end "A" to said second end "B" of the pole section;

telescoping means included within the pole section for increasing and decreasing the physical distance between said first end "A" and said second end "B";

linear transducer means mechanically connected to the telescoping means and electrically connected to output a signal representative of the physical distance between said first end "A" and said second end "B";

a satellite navigation receiver connected to the battery and for collecting satellite range measurement data at said first end "A" with the antenna; and a radio transceiver and modem connected to the satellite navigation receiver, the battery, the linear transducer, the level sensor and the direction sensor for transmitting data for remote calculation of an estimate for a position fix of said second end "B" of the pole section as determined by a position-fix of said first end "A" and a vector with a length represented by said output of the linear transducer and a direction indicated by both the level sensor and the direction sensor.

\* \* \* \* \*